(12) United States Patent
Jammes et al.

(10) Patent No.: US 8,890,875 B2
(45) Date of Patent: Nov. 18, 2014

(54) PROCESSING METHOD FOR CAPTURING MOVEMENT OF AN ARTICULATED STRUCTURE

(75) Inventors: Fabien Jammes, Cuvat (FR); Bruno Flament, Sant Julien de Ratz (FR); Pierre-Brice Wieber, Grenoble (FR)

(73) Assignees: Commissariat a l'Energie Atomique, Paris (FR); Inria Institut National de Recherche en Informatique et en Automatique, Le Chesnay (FR)

( * ) Notice: Subject to any disclaimer, the term of this patent is extended or adjusted under 35 U.S.C. 154(b) by 1482 days.

(21) Appl. No.: 12/108,117

(22) Filed: Apr. 23, 2008

(65) Prior Publication Data

US 2008/0278497 A1   Nov. 13, 2008

(30) Foreign Application Priority Data

May 11, 2007   (FR) ...................... 07 55008

(51) Int. Cl.
*G06T 13/00* (2011.01)
*B25J 9/16* (2006.01)
(52) U.S. Cl.
CPC ..................... *B25J 9/1664* (2013.01)
USPC .......................................... 345/474; 345/419
(58) Field of Classification Search
None
See application file for complete search history.

(56) References Cited

U.S. PATENT DOCUMENTS

| | | | | |
|---|---|---|---|---|
| 6,115,052 A | * | 9/2000 | Freeman et al. | 345/473 |
| 6,148,280 A | * | 11/2000 | Kramer | 702/153 |
| 6,522,312 B2 | * | 2/2003 | Ohshima et al. | 345/8 |
| 6,625,569 B2 | * | 9/2003 | James et al. | 702/183 |
| 2002/0084974 A1 | * | 7/2002 | Ohshima et al. | 345/156 |
| 2002/0097245 A1 | | 7/2002 | Jeong et al. | |
| 2006/0022833 A1 | * | 2/2006 | Ferguson et al. | 340/573.1 |

FOREIGN PATENT DOCUMENTS

DE    195 01 094 A1    7/1996

OTHER PUBLICATIONS

Xiaoping Yun, et al., "Implementation and Experimental Results of a Quaternion-Based Kalman Filter for Human Body Motion Tracking", Proceedings of the 2005 IEEE, International Conference on Robotics and Automation, XP010872288, ISBN: 0-7803-8914-X, Apr. 18-22, 2005, pp. 317-322.
Jihong Lee, et al., "Real-Time Motion Capture for a Human Body using Accelerometers", Robotica, vol. 19, 2001, pp. 601-610.

* cited by examiner

*Primary Examiner* — Daniel Hajnik
(74) *Attorney, Agent, or Firm* — Oblon, Spivak, McClelland, Maier & Neustadt, L.L.P.

(57) ABSTRACT

A method of obtaining simulated parameters ($\overline{pos(t)}$, $\overline{vit(t)}$, $\overline{acc(t)}$, $\overline{par(t)}$) able to characterize the movement of an articulated structure provided with sensors, characterized in that the method comprises the following steps: calculating, from estimated movement state parameters of the structure, estimated measurement data ($\overline{H(t)}$, $\overline{\gamma(t)}$), each estimated measurement data item corresponding to a measurement delivered by a sensor, difference between the measurements delivered by the sensors and the estimated measurement data that correspond to them, global mathematical processing of the observer type of the data issuing from the difference in order to obtain at least one estimated difference for an estimated movement state parameter, and adding the estimated difference for the estimated movement state parameter and the estimated movement state parameter that corresponds to it in order to form a simulated parameter.

4 Claims, 8 Drawing Sheets

PROCESSING METHOD FOR CAPTURING MOVEMENT OF AN ARTICULATED STRUCTURE

TECHNICAL FIELD AND PRIOR ART

The invention concerns a processing method for capturing movement of an articulated structure and more precisely a method of obtaining simulated parameters able to characterise the movement of an articulated structure. The invention also concerns a method of reproducing movement of an articulated structure that uses a method of obtaining simulated parameters according to the invention.

The technical field of the invention is that of the determination, using measurements, in real time or otherwise, of one or more parameters for describing the movement of an articulated structure in a given reference frame or of one or more parameters intrinsic to an articulated structure in movement and/or to a system of sensors associated with the measurement of intrinsic parameters of an articulated structure in movement.

By way of non-limitative examples, the method of the invention advantageously applies in the following cases:
- industrial applications such as robotics (the sensors are then positioned on the robot), remote operation (the sensors are then placed on a man or animal), calibration of mechanisms, etc,
- multimedia applications such as for example video games requiring interaction with the user,
- simulation applications (for example flight simulation), the creation of synthetic images and editing video games,
- medical applications,
- biomechanics.

A certain number of known systems make it possible to access an estimation of all or some of the parameters of the movement of an object that is moving. For example, the Vicon® system, the Optotrak® system, the Intersense® system, the POLHEMUS® system, etc, will be cited. All these systems, in particular optical systems of the video type, have the drawback of subjecting their users to high space constraints. This is because the users must remain in the acquisition volume (camera field, volume of the magnetic field, volume of emission of ultrasound sources, etc).

Other systems do not have this drawback. Xsens Technologies®, for example, uses inertial units containing accelerometers, magnetometers and gyrometers that make it possible to be free of any spatial restriction.

The document entitled "*Implementation and Experimental Results of a Quaternion-Based Kalman Filter for Human Body Motion Tracking*" (Xiaoping Yun, Conrado Aparicio, Eric R. Bachmann and Robert B. McGhee; Proceedings of the 2005 IEEE, International Conference on Robotics and Automation, Barcelona, Spain, April 2005) also discloses a system that uses inertial units containing an accelerometer, a magnetometer and a triaxial gyrometer. Apart from inertial units, the system uses a geometric model of the articulated body and a sensor model. The sensor model is a static model for which it is considered that the acceleration measured is solely due to gravity. In addition, the orientation of each sensor is reconstituted independently of the quantities measured by the other sensors and the filtering used is completely dependent on the gyrometers.

The use of gyrometers presents drawbacks. This is because the use of a gyrometer causes a bias during continuous rapid movements and consequently a loss of precision over time. In addition, gyrometers are costly sensors with high electrical consumption.

Other systems are also known from the prior art. The document entitled "Real-time Motion Capture for a Human Body using Accelerometers" (Jihong Lee and Insoo Ha; Robotica (2001), volume 19, pp. 601-610) discloses a system that uses essentially accelerometers and an articulated model of the body in movement making it possible to calculate the accelerations of the body step by step. This method requires knowledge of the acceleration in translation and rotation of at least one segment.

The invention does not have the drawbacks mentioned above.

DISCLOSURE OF THE INVENTION

This is because the invention concerns a method of obtaining at least one simulated parameter able to characterise, in a reference frame, a movement of an articulated structure consisting of a plurality of segments articulated on each other, at least two of these segments each being provided with a measuring sensor, characterised in that the method comprises:
- the calculation, from all or some of the estimated movement state parameters describing a movement of the articulated structure, of a mechanical model of the articulated structure and of a measurement sensor model, of estimated measurement data, each estimated measurement data item being a data item representing a measurement delivered by a sensor, at least one estimated measurement data item being expressed in the form of an equation comprising terms that combine at least one estimated movement state parameter of a segment that carries a first measurement sensor and at least one estimated movement state parameter of at least one segment different from the segment that carries the first measurement sensor (these terms will usually be referred to as "cross terms" in the remainder of the description),
- for at least two different measurement sensors, the calculation of a difference between a measurement delivered by a measurement sensor and the estimated measurement data that represents the measurement delivered,
- a global mathematical processing of the data issuing from the difference, the global mathematical processing being a processing of the observer type able to take into account said terms and delivering at least one estimated difference in an estimated movement state parameter, and
- an adding of the estimated difference relating to an estimated movement state parameter and the estimated movement state parameter that corresponds to it in order to form a simulated parameter.

The invention also concerns a method of reproducing a movement of an articulated structure from simulated parameters able to characterise a movement of an articulated structure, characterised in that the simulated parameters are obtained by a method according to the invention.

One problem resolved by the method of the invention is that of the reconstruction of a movement having rapid phases of any articulated structure, for example a human body in movement, a movement that generates not insignificant accelerations compared with the intensity of gravity. Advantageously, the method of the invention allows the reconstruction of a movement in the case where it is impossible to know the movement of a sensor or of any part of a system on which the sensor is positioned solely from the measurements delivered by this sensor.

The method of the invention is advantageously a low-cost method that dispenses with the use of gyrometers, which are appliances that have a high cost.

The method of the invention preferentially uses accelerometers and magnetometers. It advantageously comprises a number N of sensors chosen according to the need of the articulated model. There is therefore not necessarily one sensor per segment of the articulated model.

BRIEF DESCRIPTION OF THE FIGURES

Other characteristics and advantages of the invention will emerge from a reading of a preferential embodiment made with reference to the accompanying figures, among which.

In all the figures, the same references designate the same elements.

DETAILED DESCRIPTION OF A PREFERENTIAL EMBODIMENT OF THE INVENTION

Figure 1:
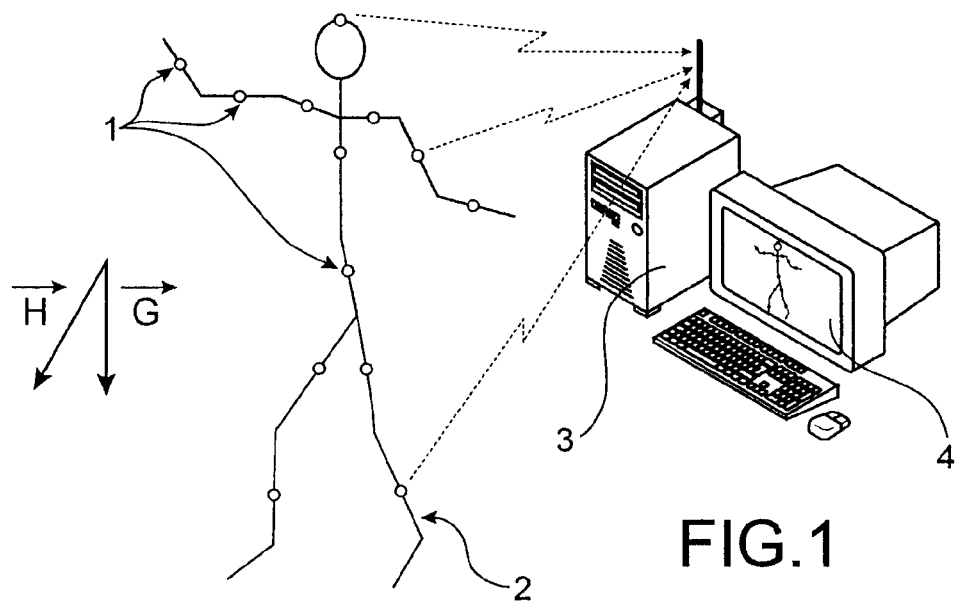
FIG. 1 depicts a system implementing the method of the invention.

FIG. 1 shows a system for implementing the method of the invention. The system comprises a set of sensors 1 distributed over a structure 2, of which the capture of all or part of the movement is sought (for example a human body), a computer 3 and a display device 4. A gravity field $\vec{G}$ and a magnetic field $\vec{H}$ fill the space in which the structure 2 moves. The sensors 1 communicate at a distance with the computer 3 and transmit their measurement data. The measurement data are processed in the computer 3 by means of previously chosen models and a global processing method that determines simulation parameters able to characterise all or part of the movement of the structure and/or which reconstructs all or part of the movement of the structure. The sensors 1 are for example accelerometers and magnetometers.

The method of the invention is characterised by the conjoint use of measurements delivered by all or some of the sensors 1, of a mechanical model of the structure whose movement it is wished to capture, of a sensor model and of a global processing of the measurement data delivered by the sensors.

It is advantageously possible to use several different mechanical structure models and/or several different sensor models. According to the preferential embodiment of the invention, the choice is made of dynamic structure models and dynamic sensor models. Such dynamic models are closer to physical reality. They make it possible not only to find with more precision the unknowns that are sought but also to find more unknowns. Simpler models than dynamic models can also be used in the context of the invention, particularly for example for capturing slow movements.

The method of the invention leads to reconstructing a state of the structure observed (human body, animal, robot). "State" of the structure observed means for example the position or velocity or acceleration of the structure, or parameters of the mechanical model of the structure, or any combination of all or some of these various elements. These states that the method of the invention makes it possible to reconstruct will usually be mentioned in the remainder of the description by the term "state parameters of the movement".

The processing method of the invention is based on the conjoint use of three essential elements. A first element is given by a mechanical model of the structure. "Mechanical model of the structure" should be taken to mean a geometric model or a kinematic model or a dynamic model of the articulated structure to be observed or any combination of these three models. The mechanical model makes it possible to connect the state of each segment of the model to the global state of the structure (taking account for example of the composition of the velocities and accelerations if velocity and acceleration form part of the global state). The mechanical model can be composed of a certain number of parameters, known or not, such as for example the lengths of the segments that constitute the articulated structure, the masses of the various constituent elements of the structure, the inertial properties of these various elements, etc. In general terms, the mechanical model will include particularities peculiar to the structure so as to limit the parameters obtained for the movement solely to the values that have a physical sense. For example, in the case of the human body, the existence of the articular ridge of the elbow (which cannot turn round) is preferentially integrated in the model.

The second element is the sensor model. The model of the sensor is a function that represents the various measurement data of the sensor according to various parameters that characterise the sensor in a reference frame (orientation, position, velocity, acceleration, etc). According to the preferential embodiment of the invention, the sensors are accelerometers and magnetometers. For the accelerometers, the sensor model will consequently give an estimation of the measurement of the acceleration according to the parameters chosen. For the magnetometers, it is an estimation of the measurement of the magnetic field according to the chosen parameters that will be given.

Other types of sensor can be used in the context of the invention, either to add to the accelerometers and magnetometers or to be substituted for all or some of them. The choice of the sensors will depend on the type of movement that it is wished to sense. At least one of the sensors among accelerometers, magnetometers, gyrometers, force sensors, goniometers and GPS sensors (GPS standing for "Global Positioning System") will be chosen.

The mechanical model of the structure and the sensor model can be merged in a single model. This single model then associates with each global state of the system an estimation of what each sensor measures (estimated measurement).

The association of the mechanical model of the structure and the sensor model makes it possible to make "cross" terms appear in the expression of the measurement estimations. The terms referred to as "cross" are, when a sensor of index "i" carried by a segment of index "i" is considered, terms that involve parameters relating to at least one segment of index "j" different from "i". The sensor of index "i" then gives information on the movement of the segments of index "i" and "j" information that appears in the cross terms.

Figure 2:
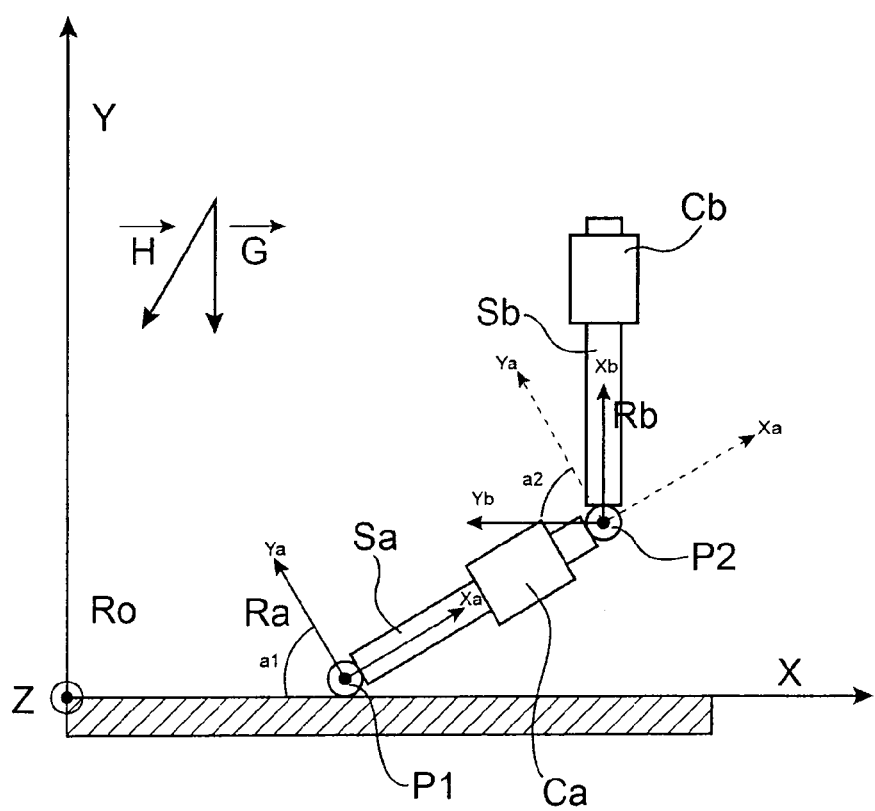
FIG. 2 depicts an example of an articulated body equipped with sensors according to the invention.

FIG. 2 illustrates the influence of the cross terms. FIG. 2 depicts two articulated segments Sa and Sb able to move in a reference frame $R_0$ (X, Y, Z). A gravity field $\vec{G}$ and magnetic field $\vec{H}$ fill the reference frame $R_0$. The segment Sa is equipped with a sensor Ca, for example a triaxial accelerometer, and the segment Sb is equipped with a sensor Cb, for example a triaxial accelerometer. A reference frame $R_a$ (Xa, Ya, Za) is linked to the segment Sa and a reference frame $R_b$ (Xb, Yb, Zb) is linked to the segment Sb. An articulation element P1 fixed to the plane Y=0 allows the segment Sa to pivot in the plane (X, Y) and an articulation element P2 connecting the segments Sa and Sb allows the segment Sb to pivot, in a plane (X, Y), about the segment Sa. An angle a1 represents the pivoting of the segment Sa in the reference frame $R_0$ and an angle a2 represents the pivoting of the segment Sb in the reference frame $R_a$. It thus appears clearly that the measurement of the sensor Cb is influenced not only by the angle a2 but also by the angle a1. In the expression of the measurement of the sensor Cb, all the terms containing the angle a1, the angular velocity da1/dt and the angular acceleration $d^2a1/dt^2$ are cross terms.

The third element is a processing method that, from the model data (structure model plus sensor model or single merged structure/sensor model), seeks all the unknowns at the same time. This method minimises the distance that separates the measurement estimations calculated from the model and the real measurements. The real measurements can be pre-recorded or recorded continuously. They may be complete or incomplete. The processing method is a global mathematical method of the observer type that is known per se. According to the preferential embodiment of the invention, the processing method is extended Kalman filtering. Any other global data processing method can also be used such as for example optimisation methods with constraints or without constraints, particulate filtering, methods of the sliding horizon observer type or more generally any method of the linear or non-linear observer type. The use of a global data treatment method (modelling data and measurement data) is necessary to take into account the cross terms mentioned previously.

In the methods of the prior art mentioned above, the sensor model is an approximated model and it is necessary to provided additional information, such as for example a gyrometer measurement, to complete this model. With this approximated model completed by this supplementary information, it is possible to determine the orientation of the sensor and therefore the orientation of the segment that carries the sensor (with the errors relating to the approximations). It is here important to note that the processing of the data measured by a sensor alone does not then pose any problem since, in this case, the missing information (the acceleration relating to the movement) is supplied by another type of measurement (but not by the accelerometer or magnetometer). Whatever the articulated structure and the types of connection that exist between the segments, the movement of the articulated chain can thus be found.

In the case of the invention, without making any approximation on the model and without using other types of measurements, the modelling is pushed so as to reveal cross terms. The cross terms contain additional information necessary for the resolution of the problem. The cross terms being present only when several sensors are present, the method of the invention does not therefore make it possible to correctly determine the orientation of a sensor taken in isolation. The data relating to the cross terms also depend on the type of articulation between the segments.

Because of the complexity of certain systems to be studied, the method of the invention provides for an improvement of tests referred to as "observability tests". The observability tests make it possible to determine whether the nature of the sensors and their distribution geometry on the structure make it possible to lead to a correct reconstruction of the articulated movement. For chosen sensors and distribution geometry, by relying on the mechanical model and the sensor model, it is then established, by standard mathematical methods, whether the information obtained by this sensor configuration and distribution geometry make it possible to know the parameters of the movement that it is wished to determine. An example of a standard mathematical method is given in the following pages.

Advantageously, the processing method of the invention is sufficiently robust to make it possible not to have to place a sensor on each segment whereas the sensing of the movement obtained by the method of the invention leads to a determination of the movement of all the segments in the structure.

Not only does the method of the invention not require the use of additional measurements but it does not make approximations on the model, which advantageously results in avoiding the appearance of errors in the estimation of the movement.

Figure 3:
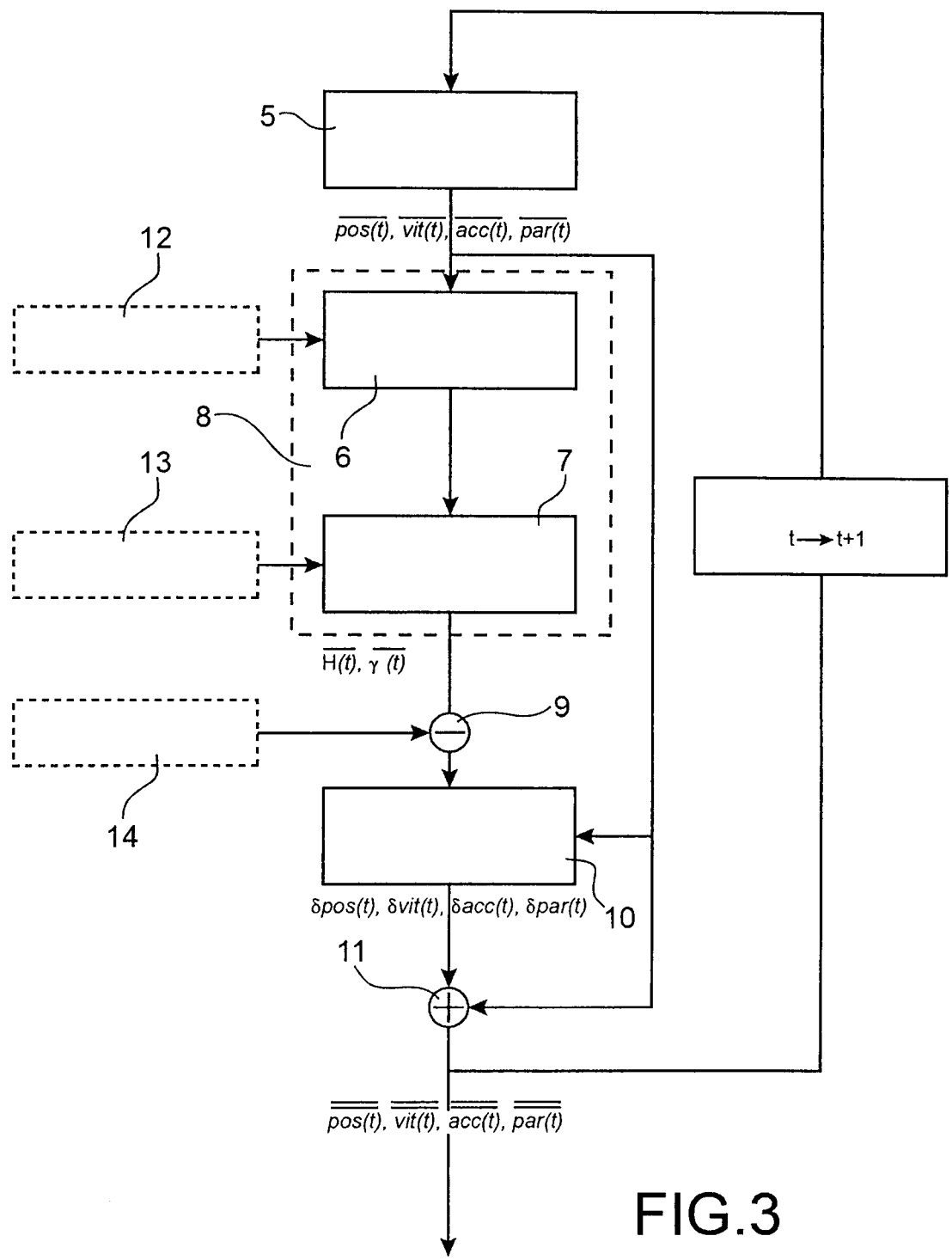
FIG. 3 depicts a flow diagram for implementation of the method of the invention according to a first embodiment.

FIG. 3 shows a first flow diagram for implementation of the method of the invention. A prediction model 5 is first of all established. The prediction model is the change model for the unknowns (state and/or parameters) observed between successive times t−1 and t. The prediction model is thus a function that gives an estimation of the state and/or the parameters that define the system at time t as a function of the value of the state and/or of the parameters at time t−1. The state of the system is defined, at a time t, by the state parameters of the movement, which are the position pos(t), the velocity vit(t), the acceleration acc(t) and the parameters par(t) defined previously as parameters of the mechanical model or a combination of the previous parameters. The following then comes:

$$[pos(t),vit(t),acc(t),par(t)]=f[pos(t-1),vit(t-1),acc(t-1),par(t-1)]$$

At the output of the prediction model 5, there is then a set of estimated movement state parameters describing the movement of the articulated structure $\overline{pos(t)}$, $\overline{vit(t)}$, $\overline{acc(t)}$, $\overline{par(t)}$. These estimated parameters are then entered in the mechanical model 6 of the structure. According to an improvement to the invention, the mechanical model 6 is supplemented by data 12 referred to as "a priori structure knowledge data" that describe the structure (for example dimensions and weight of segments, inertia matrix, etc) or that represent all or some of the movements performed by the structure (position and/or velocity and/or acceleration information). The mechanical model 6 delivers orientation, position, velocity and acceleration data for the sensors that are entered in the sensor model 7. According to another improvement to the invention, the sensor model 7 is supplemented by data 13 referred to as "a priori sensor knowledge data" that describe properties of the sensors (for example sensitivity, offset, drift, etc) or that represent all or some of the movements performed by the sensors. The sensor model 7 delivers estimated data that represent the measurement of the sensors when the latter have the orientation and/or position and/or velocity and/or acceleration provided for by the model. As mentioned previously the mechanical model and the sensor model can be merged in a single model. This single model is referenced 8 in FIG. 3. The estimated data delivered by the sensor model 7 or by the single model 8 are for example a magnetic field measurement estimation at time t $\overline{H(t)}$ and an acceleration measurement estimation at time t $\overline{\gamma(t)}$. These measurement estimations are then compared in a comparison module 9 with the real measurements delivered by the sensors. The result of the comparison establishes the difference between the quantities compared. This difference is then entered in the global processing module 10 of the mathematical observer type such as for example an extended Kalman filtering module, an optimisation module with or without constraints, a particulate filtering module, a processing module of the sliding horizon observer type, etc. The module 10 delivers estimated differences δpos(t), δvit(t), δacc(t), δpar(t) of the estimated movement state parameters, differences intended to correct the various estimated parameters that correspond to them. An adding operator 11 then receives on a first series of inputs the estimated data $\overline{pos(t)}$, $\overline{vit(t)}$, $\overline{acc(t)}$, $\overline{par(t)}$ and, on a second series of inputs, the estimated differences δpos(t), δvit(t), δacc(t), δpar(t) and delivers as an output the simulated data sought $\overline{\overline{pos(t)}}$, $\overline{\overline{vit(t)}}$, $\overline{\overline{acc(t)}}$, $\overline{\overline{par(t)}}$ which make it possible to reconstitute the movement of the structure.

Then:

$$\overline{\overline{pos(t)}} = \overline{pos(t)} + \delta pos(t),$$

$$\overline{\overline{vit(t)}} = \overline{vit(t)} + \delta vit(t),$$

$$\overline{\overline{acc(t)}} = \overline{acc(t)} + \delta acc(t),$$

$$\overline{\overline{par(t)}} = \overline{par(t)} + \delta par(t)$$

The data $\overline{\overline{pos(t)}}$, $\overline{\overline{vit(t)}}$, $\overline{\overline{acc(t)}}$, $\overline{\overline{par(t)}}$ are then transmitted to the prediction model 5 in order to become new estimated parameters at a subsequent time.

Figure 4:
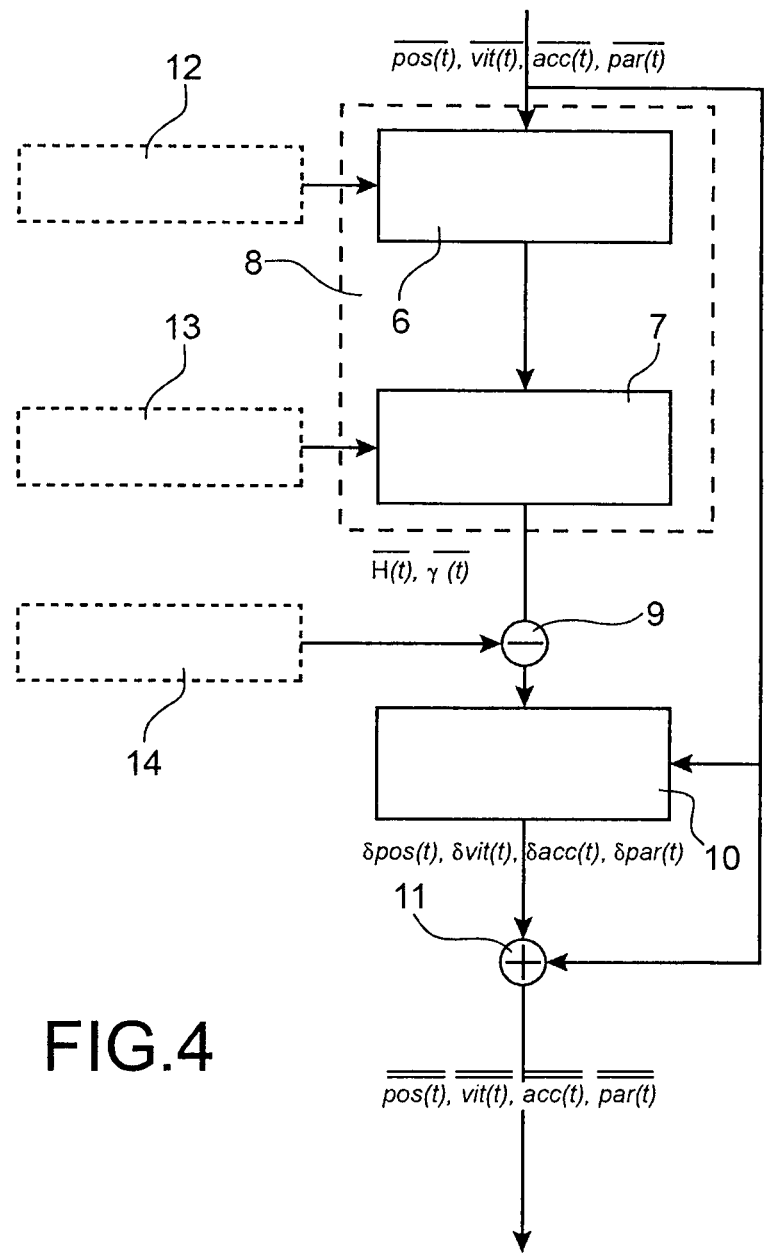
FIG. 4 depicts a flow diagram for implementation of the method of the invention according to a second embodiment.

FIG. 4 shows a flow diagram for implementation of the method of the invention according to a second embodiment. According to the second embodiment, there is no prediction model and the estimated parameters $\overline{pos(t-1)}$, $\overline{vit(t-1)}$, $\overline{acc(t-1)}$, $\overline{par(t-1)}$ are then entered directly in the mechanical model 6. It is then advantageously possible to enter, bit by bit, supplementary estimation data 12 in the mechanical model. The method is moreover identical to the method described in the first embodiment.

Figure 5:
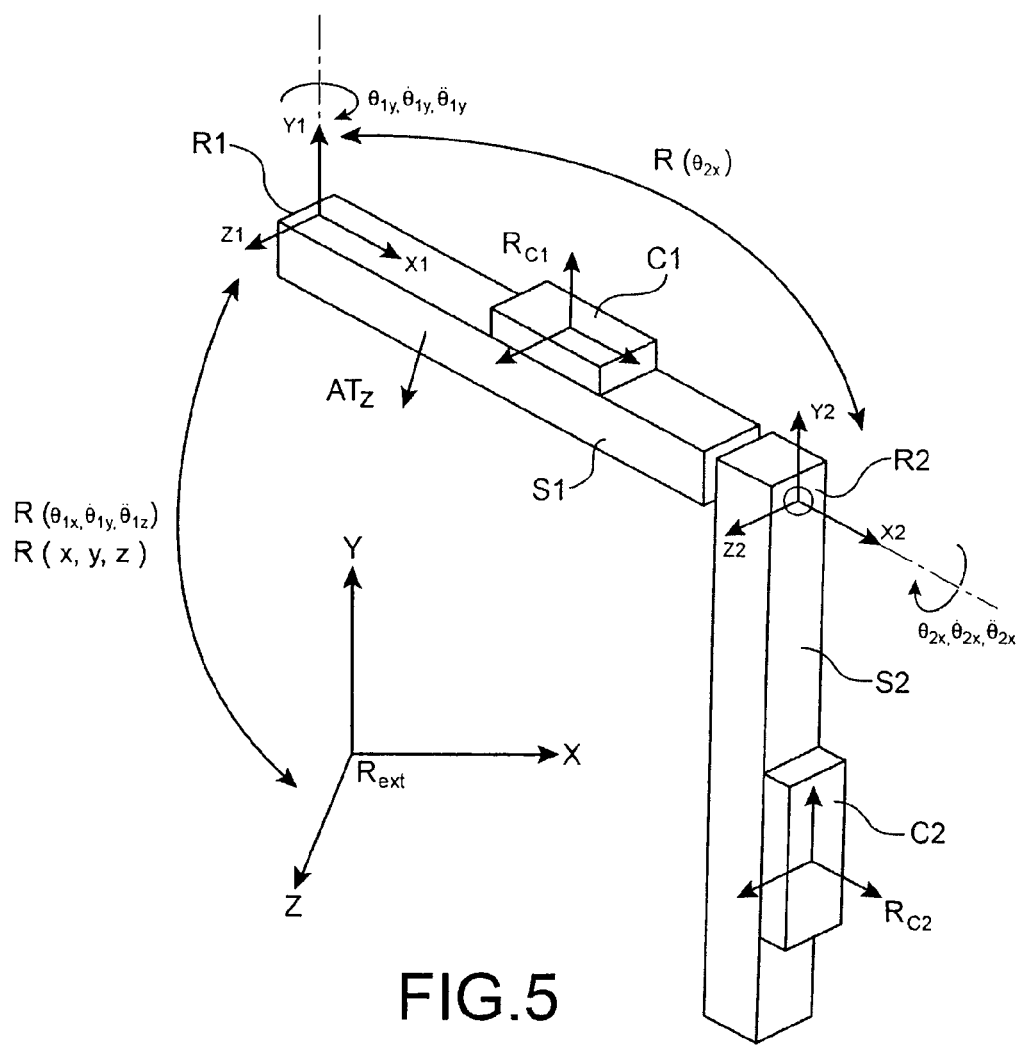
FIG. 5 depicts an example of an articulated body equipped with sensors for which the method of the invention is able to effect a movement capture.

A particular example of movement capture according to the method of the invention will now be described with reference to FIG. 5. FIG. 5 shows, in a reference frame $R_{ext}$ (X, Y, Z), an articulated structure consisting of two segments S1 and S2 connected together by a rotoid connection (1 degree of freedom). A reference frame R1 (x1, y1, z1) is linked to the segment S1 and a reference frame R2 (x2, y2, z2) is linked to the segment S2. A sensor C1 is fixed to the segment S1 and a sensor C2 is fixed to the segment S2. Each sensor C1, C2 contains a triaxial accelerometer and a triaxial magnetometer. The system thus described has one degree of freedom for articulation between the segments S1 and S2 and six degrees of freedom, in rotation and translation, for the whole of the structure formed by the two segments S1, S2. It is therefore seven unknowns that it is necessary to determine.

A simulation of movement of the structure is given as follows: the segment S2 turns about the vertical axis y2 of the reference frame R2 with an constant angular acceleration and the segment S1 turns about the rotation axis x1 of the reference frame R1 with an also constant angular acceleration. The whole of the system performs a translation defined by an acceleration $AT_z$.

For a sensor C, the estimations of measurement of acceleration $\overline{\gamma}_C$ and magnetic field $\overline{H}_C$ (equations of the model) are given, in the reference frame of the sensor C, by the following equations (1):

$$\begin{cases} \overline{\gamma}_C = {}^C R_{ext} \times (\vec{G} - \vec{a}_c) \\ \overline{H}_C = {}^C R_{ext} \times (\vec{H}) \end{cases} \quad (1)$$

where:

the vectors $\vec{a}_c$, $\vec{G}$ and $\vec{H}$ are respectively the acceleration of the sensor, the acceleration due to gravity and the external magnetic field expressed in the external reference frame $R_{ext}$, and $^C R_{ext}$ is the rotation matrix between the reference frame linked to the sensor and the reference frame $R_{ext}$.

The way in which the rotation and translation between the reference frame linked to the sensor and the external reference frame are expressed is the expression of the geometric model of the articulated chain. The rotation $^C R_{ext}$ is consequently broken down according to the parameters of the articulated chain. There are then obtained, for the respective sensors C1 and C2, the following measurement estimations collected together under the reference (2):

$$\begin{cases} \overline{\gamma}_{C1} = {}^C R_0(\theta_1) \times (\vec{G} - \vec{a}_{C1}) \\ \overline{H}_{C1} = {}^{C_1} R_0(\theta_1) \times (\vec{H}) \end{cases} \quad (2)$$

$$\begin{cases} \overline{\gamma}_{C2} = {}^{C_2} R_1(\theta_{2x}) \times {}^1 R_0(\theta_1) \times (\vec{G} - \vec{a}_{C2}) \\ \overline{H}_{C2} = {}^{C_2} R_1(\theta_{2x}) \times {}^1 R_0(\theta_1) \times (\vec{H}) \end{cases}$$

where:

the terms $\overline{\gamma}_{C1}$, $\overline{H}_{C1}$ are the estimations of measurement of acceleration and magnetic field in the reference frame R1, the terms $\overline{\gamma}_{C2}$, $\overline{H}_{C2}$ are the estimations of measurement of acceleration and magnetic field in the reference frame R2, and the vectors $\vec{\theta}1$ and $\vec{\theta}2$ are respectively the rotation vector of the segment S1 in the reference frame of $R_{ext}$ and the rotation vector of the segment S2 about the segment S1.

The vector $\vec{\theta}1$ breaks down into three rotation angles $\vec{\theta}1_x$, $\vec{\theta}1_y$, $\vec{\theta}1_z$ on the axes X, Y and Z of the reference frame $R_{ext}$.

The measurements delivered by a sensor C are expressed in the reference frame $R_c$ of the sensor. The expressions of the accelerations $\vec{a}_{c1}$ and $\vec{a}_{c2}$, which are measured by the respective sensors C1 and C2, are thus as follows:

$$\vec{a}_{C1} = \vec{A}_T + \dot{\vec{\theta}}_1 \wedge \overrightarrow{O_1C_1} + \vec{\theta}_1 \wedge \dot{\vec{\theta}}_1 \wedge \overrightarrow{O_1C_1} \quad (3)$$

$$\vec{a}_{C2} = \vec{A}_T + \ddot{\vec{\theta}}_1 \wedge \overrightarrow{O_1C_2} + \dot{\vec{\theta}}_1 \wedge \dot{\vec{\theta}}_1 \wedge \overrightarrow{O_1C_2} + \ddot{\vec{\theta}}_{2x} \wedge \overrightarrow{O_2C_2} + \dot{\vec{\theta}}_{2x} \wedge \dot{\vec{\theta}}_{2x} \wedge \overrightarrow{O_2C_2}$$

where the symbol "∧" represents the "vectorial product" operation and:

the term $\vec{A}_T$ represents the translation acceleration that concerns the whole articulated structure, the terms $\dot{\vec{\theta}}$ and $\ddot{\vec{\theta}}$ represent respectively the first derivative and the second derivative of the quantity $\vec{\theta}$ with respect to time, and $\overline{O_iC_j}$ the position vector of the sensor $C_j$ in the reference frame Ri (i=1,2).

In the example chosen, the cross terms, which are an essential element of the method of the invention, are the terms that comprise the variables $\vec{\theta}_1$, $\vec{\dot{\theta}}_1$, $\vec{\ddot{\theta}}_1$ and $\vec{A}_T$ for the expression of the measurement of the sensor 2. By seeking all the parameters of the movement at the same time, and therefore using the two sensors C1 and C2 at the same time, it is thus possible to recover information on the parameters of the segment S1 by means of measurements coming from the sensor 2.

An extended Kalman filter is used for seeking the unknowns of the system. A vector I is formed with the unknowns, said vector being composed of three elementary vectors, namely a position vector, a velocity vector and an acceleration vector.

The position vector consists of the translation positions in space (the three degrees of translation freedom $T_x$, $T_y$, $T_z$, of the segment S1) and the angular positions (the three degrees of rotation freedom $\theta_{1x}$, $\theta_{1y}$, $\theta_{1z}$, of the segment S1 plus the degree of rotation freedom $\theta_{2x}$ of the articulation).

The velocity vector is the first derivative with respect to time of the position vector. It therefore comprises the translation velocities and the angular velocities.

The acceleration vector is the second derivative with respect to time of the position vector. It therefore consists of the translation accelerations (the variables $A_{Tx}$, $A_{Ty}$ and $A_{Tz}$ of equation 2) and angular accelerations.

This gives:

$$\vec{I} = [T_x, T_y, T_z, \theta_{1x}, \theta_{1y}, \theta_{1z}, \theta_{2x}, V_{Tx}, V_{Ty}, V_{Tz}, \dot{\theta}_{1x}, \dot{\theta}_{1y}, \dot{\theta}_{1z}, \dot{\theta}_{2x}, \\ A_{Tx}, A_{Ty}, A_{Tz}, \ddot{\theta}_{1x}, \ddot{\theta}_{1y}, \ddot{\theta}_{1z}, \ddot{\theta}_{2x}] \quad (4)$$

This vector can be put in the form $\vec{I} = [\vec{pos}, \vec{vit}, \vec{acc}]$ where $\vec{pos}$ is a position vector, $\vec{vit}$ a velocity vector and $\vec{acc}$ an acceleration vector. It should be noted that neither of equations (1) and (2) mentioned above and which describe the model is a function of the translation positions or translation velocities. These two quantities have no influence on the measurements and are therefore not necessary (and not observable by the Kalman filter). Keeping them does however have the advantage of simplifying the writing of the evolution matrix for the state of the system.

The dynamics of the system are then written by means of the following system of equations (5):

$$\begin{cases} I_k = A \cdot I_{k-1} + \omega_{k-1} \\ m_k = h(I_k) + t_k \end{cases} \quad (5)$$

where k represents the index of the current iteration, I the state of the system, A the evolution matrix for the state of the system, ω the noise of the method, m the measurement, h the measurement function and t the measurement noise.

With reference to FIG. 3 described above, the data that constitute the matrix A are entered in the prediction model 5. With reference to FIG. 4, the matrix A is the Identity matrix and is consequently not shown in the flow diagram.

The matrix A is here defined as follows, Δt being the period that separates the time $t_k$ from the time $t_{k+1}$:

$$A = \begin{pmatrix} 1 & \Delta t & 0.5\Delta t^2 \\ 0 & 1 & \Delta t \\ 0 & 0 & 1 \end{pmatrix}$$

The function h mentioned above makes it possible to calculate an estimation of the measurements of each sensor. This function is written:

$$[\vec{\gamma}_{C1}, \vec{H}_{C1}, \vec{\gamma}_{C2}, \vec{H}_{C2}] = h(\text{pos}, \text{vit}, \text{acc})$$

The Kalman filter functioning on linear systems, it is its extension to non-linear systems that is used in the context of the invention (extended Kalman filtering). For this purpose the Jacobean of the function h of the system written above is calculated. The equations of the extended Kalman filter then find the following iterate that minimises the error between the estimation of the measurement and the real measurement by taking into account all the available information.

FIGS. 6, 7A-7D, 8A-8D, 9A-9D show results obtained, for the system shown in FIG. 5, by the method of the invention.

The values of the estimated accelerations of the movement $A_{Tx}$, $\ddot{\theta}_{1y}$, $\ddot{\theta}_{2x}$ and of the time step Δt are as follows (the position and velocity value are zero at the start of the movement):

$$A_{Tx} = 0.1 \text{ m·s}^{-2}$$

$$\ddot{\theta}_{1y} = 1 \text{ rad·s}^{-2}$$

$$\ddot{\theta}_{2x} = 0.7 \text{ rad·s}^{-2}$$

$$\Delta t = 0.01 \text{ s}$$

In addition, a Gaussian noise of zero mean and variance 0.05 is then added to all the measurement estimations.

It is now possible to carry out an observability test to verify that the nature of the sensors and their distribution geometry makes possible a correct reconstruction of the articulated movement. One of the mathematical methods for performing this test is described below.

Let $J_h(\text{pos}, \text{vel}, \text{acc})$ be the Jacobean matrix of the measurement function h(pos, vel, acc). The matrix M is then constructed such that:

$$M = \begin{bmatrix} H \\ HA \\ HA^2 \\ \vdots \\ HA^{n-1} \end{bmatrix}$$

where n is the dimension of the matrix A.

If the matrix M is full rank, then it is possible to state that the nature of the sensors and their distribution geometry makes a correct reconstruction of the articulated movement possible.

Figure 6:
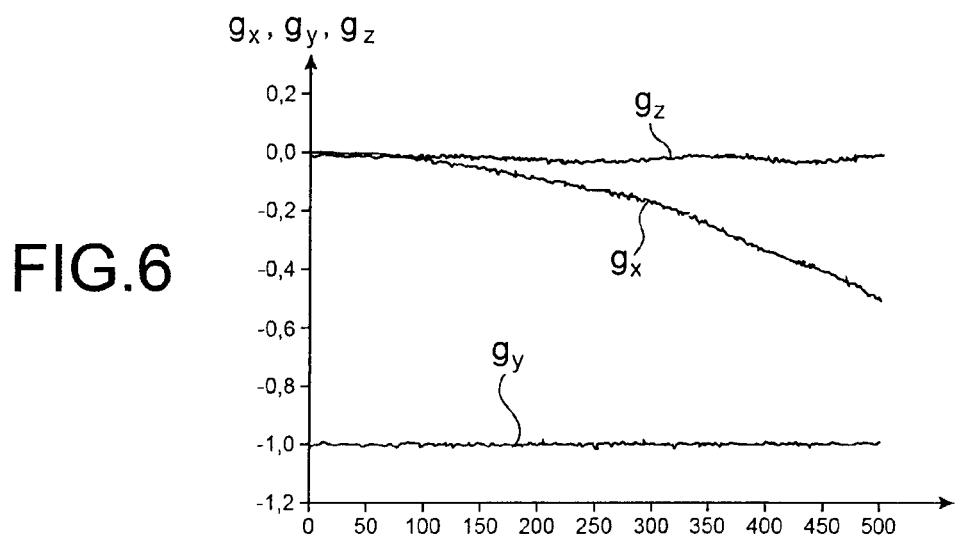
FIG. 6 depicts acceleration measurements delivered by the articulated body shown in FIG. 5 (the case where the sensors are accelerometers)

The sensor 1 is an accelerometer. FIG. 6 shows the curves of the measurements of the components, in the reference frame R1, of the vector composed of the acceleration due to gravity $\vec{g}$ and the acceleration of the movement both delivered by the sensor 1, according to the incrementations of the time step Δt. The curve $g_x$ represents the acceleration component along X1, the curve $g_y$ represents the acceleration component along Y1 and the curve $g_z$ the acceleration component along Z1.

Each of the FIGS. 7A-7D, 8A-8B and 9A-9D show comparison curves, as a function of time, between values delivered at the end of the method of the invention (delivered simulated values) and theoretical values (reference values) that correspond to them.

Figure 7A:
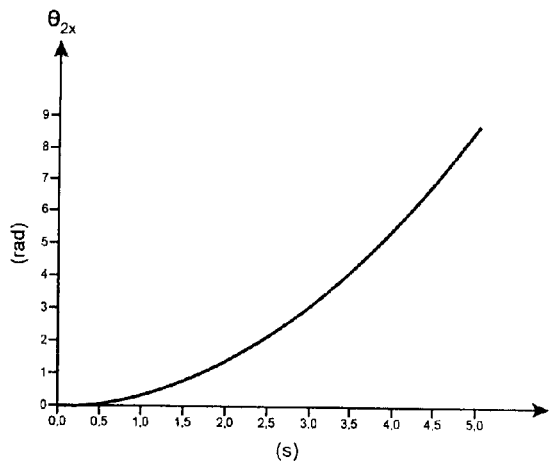
FIGS. 7A-7D depict reference and estimated orientation angles for the capture of the movement of the body shown by way of example in FIG. 5.

FIG. 7A shows the change as a function of time in the delivered estimated value (curve a1) and the reference value (curve a2) of the angle $\theta_{2x}$. Only one curve appears in FIG. 7A because of the almost perfect agreement between measurements and estimations of measurements.

Figure 7B:
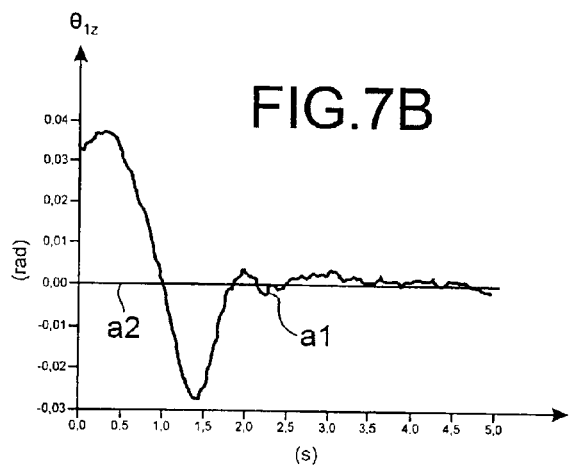

FIG. 7B shows the change as a function of time in the delivered estimated value (curve b1) and the reference value (curve b2) of the angle $\theta_{1z}$.

Figure 7C:
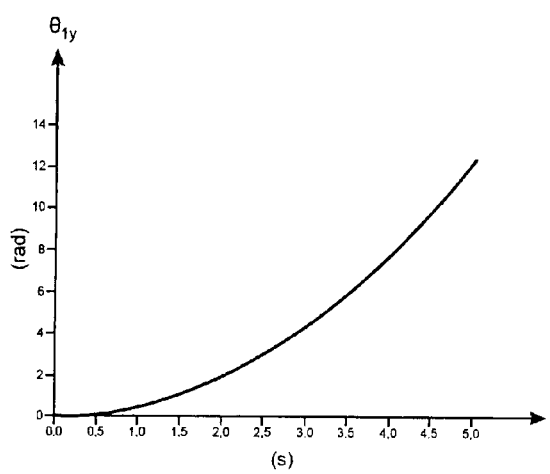

FIG. 7C shows the change as a function of time in the delivered estimated value (curve c1) and the reference value (curve c2) of the angle $\theta_{1y}$. Only one curve appears in FIG. 7C because of the almost perfect agreement between measurements and estimations of measurements.

Figure 7D:
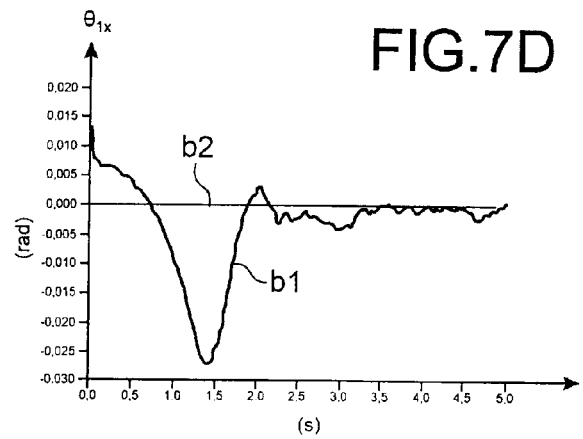

FIG. 7D shows the change as a function of time in the delivered estimated value (curve d1) and the reference (curve d2) of the angle $\theta_{1x}$ as a function of time.

Figure 8A:
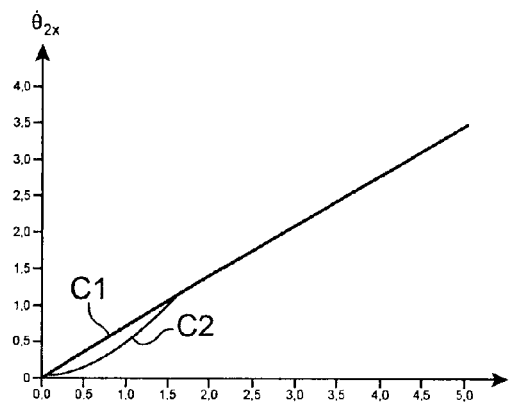
FIGS. 8A-8D depict reference and estimated angular velocities for capture of the movement of the body depicted by way of example in FIG. 5.

FIG. 8A shows the change as a function of time in the delivered estimated value (curve e1) and the reference value (curve e2) of the angular velocity $\dot{\theta}_{2x}$.

Figure 8B:
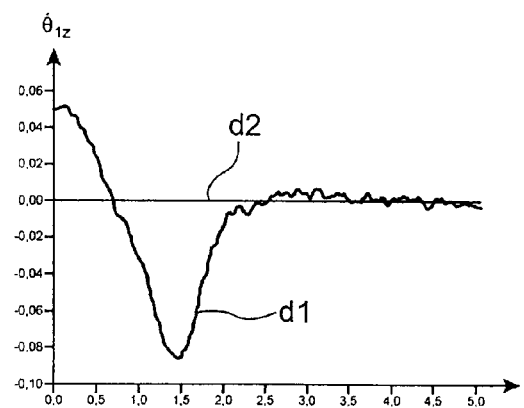

FIG. 8B shows the change as a function of time in the delivered estimated value (curve f1) and in the reference value (curve f2) of the angular velocity $\dot{\theta}_{1z}$.

Figure 8C:
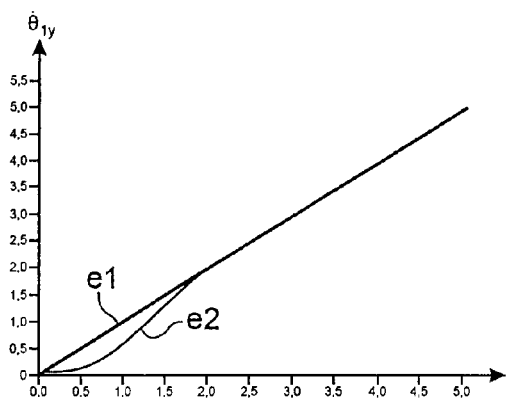

FIG. 8C shows the change as a function of time in the delivered estimated value (curve g1) and in the reference value (curve g2) of the angular velocity $\dot{\theta}_{1y}$.

Figure 8D:
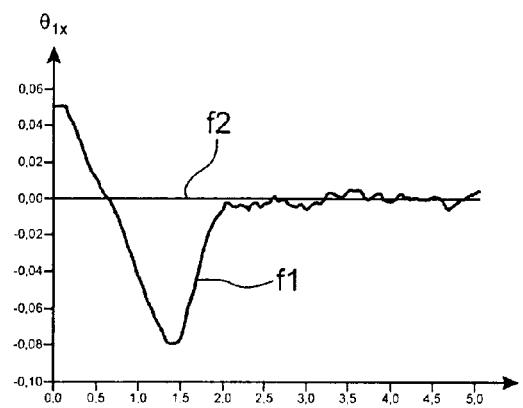

FIG. 8D shows the change as a function of time in the delivered estimated value (curve h1) and in the reference value (curve h2) of the angular velocity $\dot{\theta}_{1x}$.

Figure 9A:
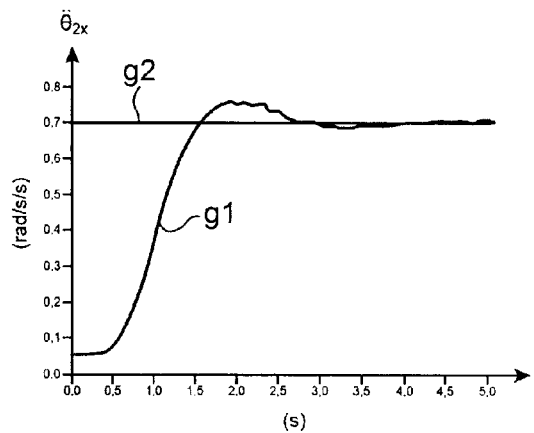
FIGS. 9A-9D show reference and estimated angular accelerations for the capture of the movement of the body shown by way of example in FIG. 5.

FIG. 9A shows the change as a function of time in the delivered estimated value (curve i1) and in the reference value (curve i2) of the angular acceleration $\ddot{\theta}_{2x}$.

Figure 9B:
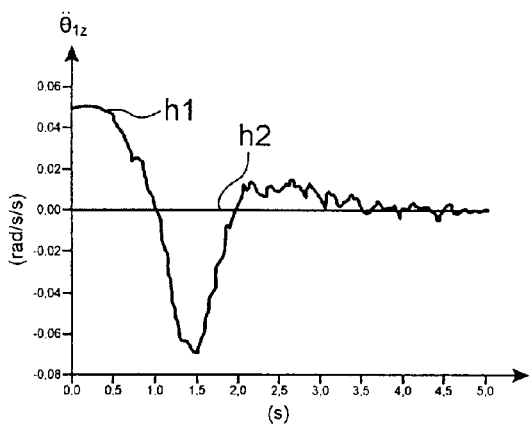

FIG. 9B shows the change as a function of time in the delivered estimated value (curve j1) and in the reference value (curve j2) of the angular acceleration $\ddot{\theta}_{1z}$.

Figure 9C:
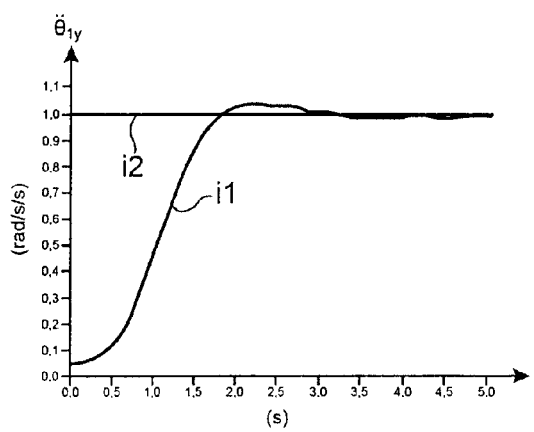

FIG. 9C shows the change as a function of time in the delivered estimated value (curve k1) and in the reference value (curve k2) of the angular acceleration $\ddot{\theta}_{1y}$.

Figure 9D:
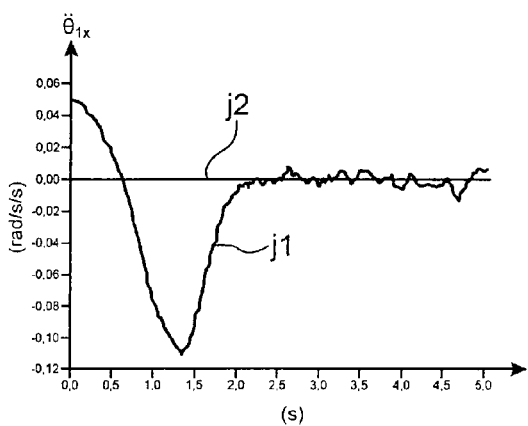

FIG. 9D shows the change as a function of time in the delivered estimated value (curve l1) and in the reference value (curve l2) of the angular acceleration $\ddot{\theta}_{1x}$.

As appears clearly in all of FIGS. 6, 7A-7D, 8A-8D and 9A-9D, the estimated values delivered by the method of the invention are very close to the expected theoretical values, which proves the pertinence of the simulation method of the invention.

Figure 10A:
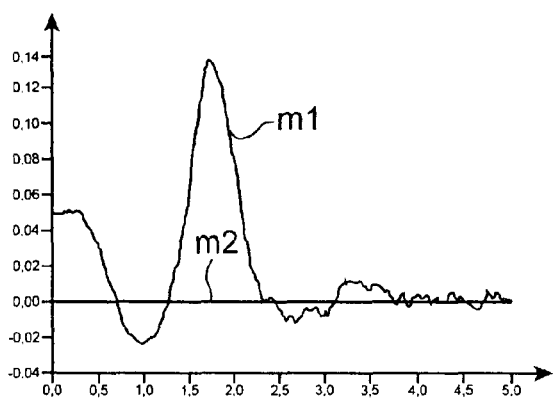
FIGS. 10A-10C show reference and estimated translations for the capture of the movement of the body depicted by way of example in FIG. 5.
Figure 10B:
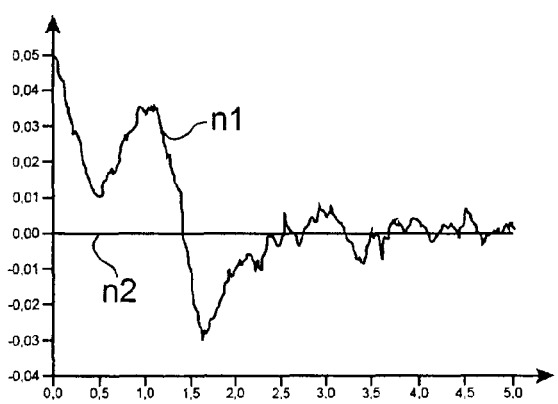
Figure 10C:
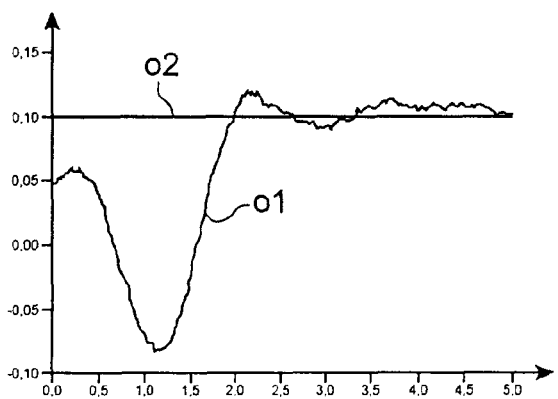

In a similar fashion, in FIGS. 10A, 10B and 10C, the change as a function of time is observed in the delivered estimated values (respective curves m1, n1, o1) and in the reference values (respective curves m2, n2, o2) of the translation accelerations ATx, ATy and ATz.

The invention claimed is:

1. A method for reproducing a movement, in a reference frame, of an articulated structure consisting of a plurality of segments articulated with respect to each other, at least two of the segments each being provided with a measurement sensor, said method comprising:
   reconstructing state parameters of said articulated structure, said state parameters describing the movement of said articulated structure;
   using a prediction model to provide an estimation of the state parameters at time t as a function of state parameters at time t−1;
   providing estimations of measurements of each measurement sensor using said estimation of the state parameters at time t and pre-stored sensor parameter data including drift, offset and sensitivity for each measurement sensor;
   providing estimated differences of said state parameters, using a minimization algorithm, which minimizes an error between said estimations of the measurements generated using the estimation of the state parameters at time t and the pre-stored sensor parameter data and real measurement data; and
   adding said estimated differences of the state parameters to said estimation of state parameters to provide updated state parameters at time t,
   wherein estimations of measurements of at least one measurement sensor related to a segment include cross terms involving at least one state parameter of a segment different from the segment that includes said measurement sensor, said minimization algorithm processing simultaneously the state parameters and the cross terms.

2. The method according to claim 1, wherein said estimations of measurements is carried out using a function h such that:

$$m_k = h(l_k) + t_k,$$

where:
   k=index of iteration,
   $m_k$=set of estimated measurements,
   $l_k$=set of state parameters,
   $t_k$=noise term, and
   said function h including said cross terms.

3. The method according to claim 2, wherein said state parameters include position, velocity and acceleration of each segment.

4. The method according to claim 1, wherein said minimization algorithm is extended Kalman filtering.

* * * * *